March 5, 1963  C. D. JONES  3,079,806
GEAR RATIO CHANGING STRUCTURE

Filed Nov. 3, 1961  3 Sheets-Sheet 1

INVENTOR:
CLEVOE D. JONES
BY
ATTORNEYS.

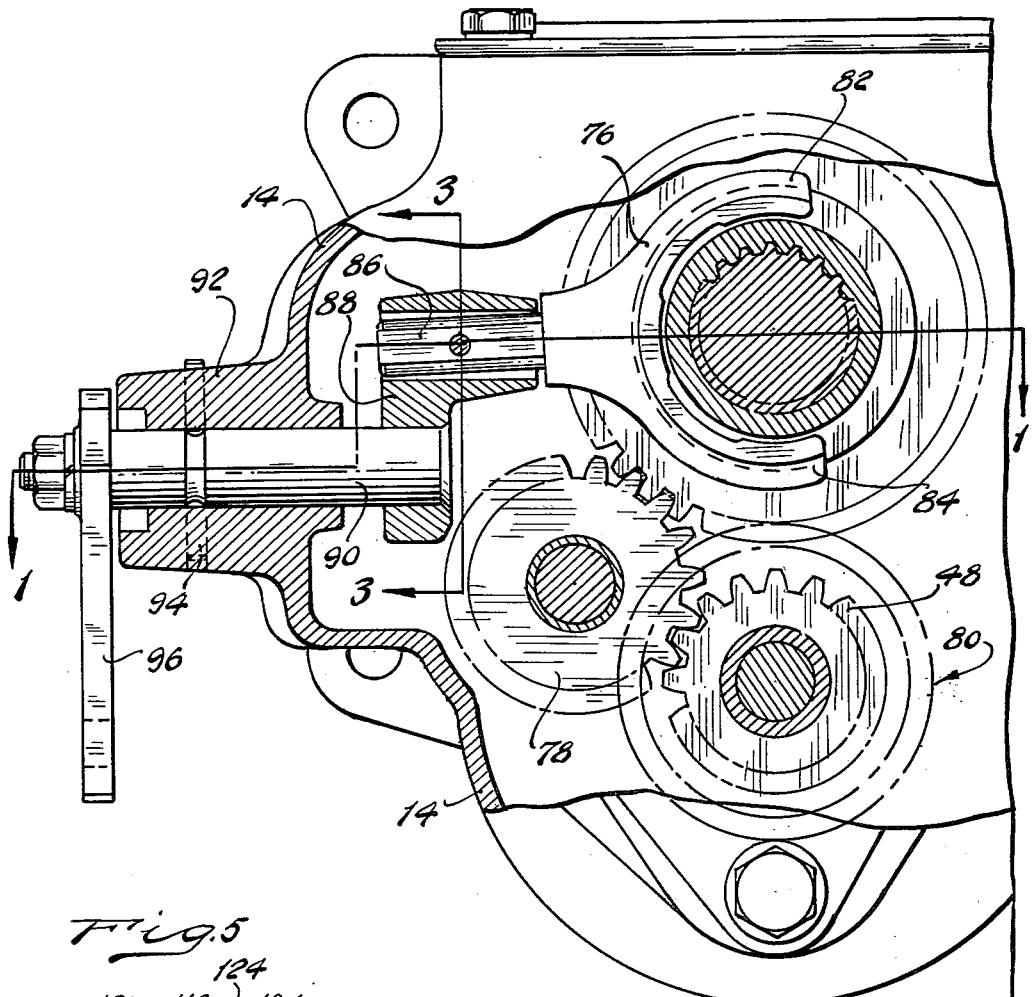
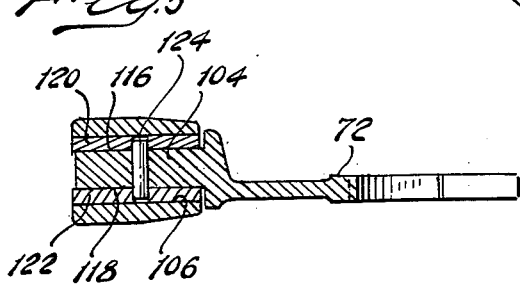

March 5, 1963

C. D. JONES 3,079,806

GEAR RATIO CHANGING STRUCTURE

Filed Nov. 3, 1961

INVENTOR:
CLEVOE D. JONES
BY
ATTORNEYS

# United States Patent Office 3,079,806
Patented Mar. 5, 1963

3,079,806
GEAR RATIO CHANGING STRUCTURE
Clevoe D. Jones, Franklin, Mich., assignor to Ford Motor Company, Dearborn, Mich., a corporation of Delaware
Filed Nov. 3, 1961, Ser. No. 149,954
6 Claims. (Cl. 74—335)

My invention relates generally to clutch mechanisms, and more particularly to a new and improved control mechanism for actuating mechanically a positively engageable clutch.

My invention can be applied readily to geared power transmission mechanisms commonly employed in vehicle power delivery trains. Such mechanisms include plural torque delivery paths defined by gear elements, and the relative speeds of rotation of the gear elements can be controlled to establish selectively any one of several torque multiplication ratios. One form of power transmission mechanism commonly employed for wheeled vehicles comprises a power input shaft and a power output shaft situated in axial alignment. A power input gear is connected to the power input shaft and a low speed gear and an intermediate speed gear are mounted upon an intermediate shaft that in turn forms an extension of the power output shaft. A cluster gear assembly is situated about a countershaft located in spaced parallel disposition with respect to the power input and power output shafts. The cluster gear assembly comprises gear elements that drivably engage the power input gear and each of the other two gears. One of these other gears is splined to the intermediate shaft and is capable of being moved axially into or out of engagement with a low speed ratio gear elements of the cluster gear assembly. Another gear element of the cluster gear assembly continuously engages the power input gear. When the other gear element is shifted in this fashion, a low speed torque delivery path is established between the power input and power output shafts.

A third gear is journaled rotatably upon the intermediate speed shaft and can be clutched selectively to the intermediate speed shaft by a synchronizer clutch mechanism. It continuously engages an intermediate speed gear element of the cluster gear assembly. When the synchronizer clutch mechanism functions to lock the third gear to the intermediate shaft, an intermediate speed torque delivery path is established between the power input and power output shafts.

To condition the transmission mechanism for forward direct drive operation, the third gear is released from the intermediate shaft and the synchronizer clutch mechanism functions to lock together the intermediate speed shaft and the power input gear. This produces a direct driving connection between the power input and power output shafts.

Reverse drive operation is established by shifting the second gear out of engagement with the low speed gear element of the cluster gear assembly and into engagement with the reverse drive pinion, the latter in turn continuously engaging a reverse drive gear element of the cluster gear assembly. This establishes a reverse torque delivery path between the power input and power output shafts.

It is common practice to employ a double acting synchronizer clutch mechanism for selecting the intermediate speed ratio and the direct drive ratio. Thus, when the third gear is released from the intermediate shaft the direct drive condition is established in sequence. Conversely, the direct drive power flow path is interrupted when the third gear is locked to the intermediate shaft.

The synchronizer clutch structure comprises external clutch teeth formed upon the power input gear and the third gear. These teeth are located on each axial side of a clutch sleeve having internal teeth. The sleeve in turn is mounted slidably upon a synchronizer clutch hub and, in turn, is carried positively by the intermediate shaft. When the sleeve is shifted in one direction, the teeth of the sleeve engage the clutch teeth of the third gear. When it is shifted in the opposite direction, the teeth of the sleeve engage the teeth of the power input gear. Synchronizer blocker rings are situated on either side of the sleeve to establish synchronism between the speeds of the sleeve and the cooperating external clutch teeth prior to shifting movement of the sleeve in either one direction or the other.

The vehicle operator controls the axial position of the synchronizer clutch sleeve by adjusting appropriately the position of the gear shift lever to either the high speed drive position or the intermediate speed position. When it is moved to a neutral position intermediate these two positions, the synchronizer clutch sleeve is adjusted to a position intermediate the clutch teeth for the adjacent gears. The clutch sleeve assumes this position when the transmission is conditioned for neutral or when it is conditioned for low speed ratio operation or reverse drive operation.

The mechanism for shifting the synchronizer clutch sleeve comprises a gear shift lever and a cooperating cam element. A shifter fork in turn is carried by the cam element, the bifurcations of the fork being received within an annular groove formed about the clutch sleeve. When the gear shift lever is rotated, the fork will be shifted angularly with respect to the axis of rotation of the gear shift lever. This angular motion of the fork will be translated into an axial shifting movement of the sleeve by reason of the connection between the bifurcations of the fork and the groove of the sleeve.

In conventional arrangements it is necessary to form the groove with a substantial depth since the distance between the ends of the bifurcations and the axis of the clutch mechanism will change depending upon the position that the sleeve is caused to assume. That is, the fork will rise and fall with respect to the clutch sleeve as the fork is shifted from the direct drive position to the intermediate speed position and vice versa. Unless the depth of the groove is selected so that compensation can be made for this rise and fall, the fork may move out of its cooperating groove. This requirement for a deep groove makes it necessary to form the synchronizer clutch sleeve with a large radial thickness and the radial dimensions of the gear mechanism thus are increased. Besides adding cost to the transmission structure, the large diameter of the clutch mechanism creates a space problem in many vehicle driveline installations.

In the improved structure of my invention I have provided a mechanical clutch actuator mechanism that does not require a large diameter clutch sleeve. It is possible to shift the clutch sleeve in either axial direction without a change in the spacing between the ends of the bifurcations of the fork and the axis of the clutch structure.

The provision of a mechanical actuator of the type above described being a principal object of my invention, it is a further object of my invention to provide an improved gear shift mechanism having a shifter fork carried by a rotary cam wherein compensation is made for radial displacement of the fork with respect to the axis of the cooperating clutch structure.

It is a further object of my invention to provide a power transmission mechanism having a simplified synchronizer clutch structure and ratio changing mechanism for actuating the same.

For the purpose of describing the principal features of a preferred embodiment of my invention, reference may be made to the accompanying drawings, wherein:

FIGURE 2 is an enlarged transverse cross-section view taken along section line 2—2 of FIGURE 1;

FIGURE 5 is a cross-sectional view taken along section line 5—5 of FIGURE 4.

Figure 1:
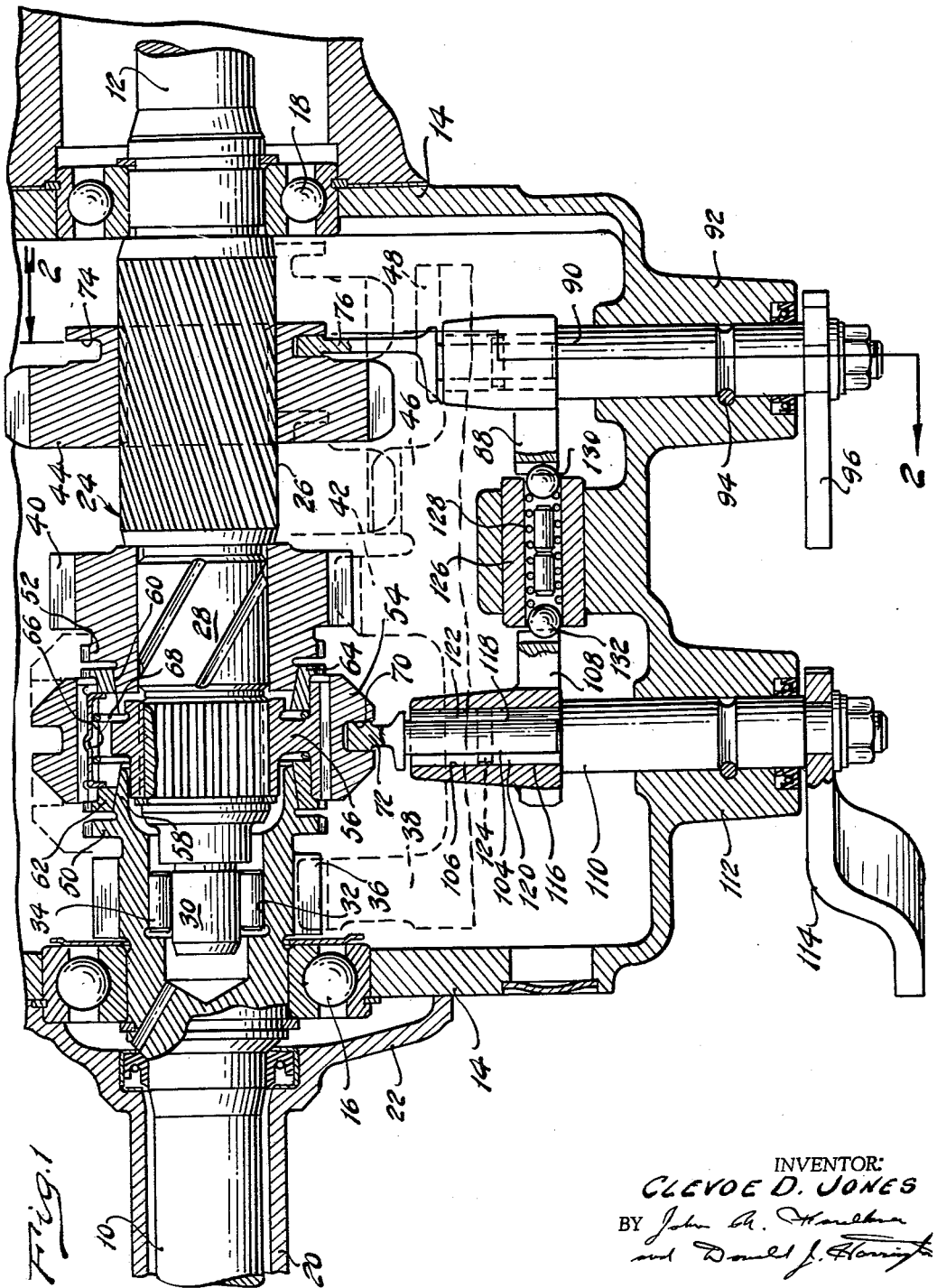
FIGURE 1 shows a cross-sectional assembly view of the transmission mechanism incorporating the improved gear ratio changing structure of my invention and is taken along section line 1—1 of FIGURE 2.

Referring first to FIGURE 1, numeral 10 designates a power input shaft and numeral 12 designates a power output shaft. A transmission casing is shown at 14 and is provided with appropriate bearing openings for receiving bearings 16 and 18. The shafts 10 and 12 are disposed in axial alignment, bearing 16 rotatably supporting shaft 10 and bearing 18 rotatably supporting shaft 12. A clutch bearing support sleeve 20 is carried by a bearing cover plate 22, the latter being bolted to the housing 14.

An intermediate shaft is designated generally by reference character 24. It includes a splined portion 26 and a bearing portion 28. The end of shaft 24 is formed with a reduced diameter as indicated at 30. This end is received within a pilot bearing opening 32 in shaft 10 and rotatably supported therein by bearing 34. The intermediate shaft 24 forms an extension of power output shaft 12.

The power input gear 36 is connected drivably to power input shaft 10. It drivably engages a gear element 38 that forms a portion of the cluster gear assembly mounted for rotation about an axis that is parallel to the axis of the shafts 10 and 12.

An intermediate speed gear 40 is journaled upon bearing portion 28 of shaft 24 and drivably engages a gear element 42 of the aforementioned cluster gear assembly.

A low and reverse gear 44 is splined to portion 26 of shaft 24 and is adapted to be moved axially thereon into engagement with a gear element 46 of the cluster gear assembly. When gear element 44 assumes the position shown in FIGURE 1 by means of full lines, it is out of engagement with gear element 46. When it is shifted in a right-hand direction, however, it drivably engages a reverse idler pinion, not shown, that in turn is in continuous meshing engagement with the reverse gear element 48 of the cluster gear assembly.

The power input gear 36 is formed with external clutch teeth 50 and gear 40 is formed also with corresponding teeth 52.

A synchronizer clutch sleeve is shown at 54. It is splined upon a synchronizer clutch hub 56 and capable of being moved axially thereon although relative rotation between hub 56 and sleeve 54 is inhibited. Hub 56 in turn is splined as indicated to intermediate shaft 24.

A cone clutch element 58 is formed adjacent clutch teeth 50 and a corresponding cone clutch element 60 is located adjacent clutch teeth 52. Synchronizer clutch blocker rings 62 and 64 are positioned upon the clutch elements 58 and 60, respectively. They are formed with external teeth that are capable of registering with internal teeth formed on the synchronizer clutch sleeve 54.

A plurality of thrust bars is provided at spaced locations within the sleeve 54, one such element being shown at 66. A detent connection between thrust bars 66 and sleeve 54 is provided so that when sleeve 54 is shifted upon the hub 56, thrust bars 66 will be urged in either one direction or the other depending upon the direction of movement of the sleeve 54. Radially expandable springs 68 urge thrust bars 66 into engagement with the internal teeth of the sleeve 54.

When the sleeve 54 is urged in a left-hand direction, thrust bars 66 cause blocker ring 62 to engage the cone clutch element 58. A lost motion connection is provided between thrust bars 66 and the ring 62 so that limited angular motion of the sleeve 54 relative to ring 62 can be accommodated. When frictional engagement of the ring 62 and element 58 is established, the angular position of the ring 62 with respect to the teeth of sleeve 54 will be adjusted so that the sleeve 54 will be blocked from moving into clutching engagement with teeth 50. When synchronism between the teeth 50 and sleeve 54 is established, the sleeve 54 can be shifted relative to the blocker ring 62 and can be moved past the blocker ring 62 into clutching engagement with teeth 50.

Blocker ring 64 functions in a fashion similar to the blocker ring 62 and establishes synchronism between shaft 24 and the gear 40 prior to clutching engagement of the sleeve 54 with teeth 52.

To establish first speed operation, gear 44 is moved in a left-hand direction into engagement with gear element 46. The torque delivery path therefore is defined by shaft 10, gear 36, gear elements 38 to 46, gear 44, shaft 24 and shaft 12.

To condition the mechanism for operation in the second speed ratio, gear 44 is moved in a right-hand direction as viewed in FIGURE 1 and clutch sleeve 54 is moved into engagement with teeth 52 thus locking gear 40 to the shaft 24. The torque delivery path then is defined by shaft 10, gear 36, gear elements 38 and 42, gear 40, shaft 24 and shaft 12.

To establish third speed ratio or direct drive operation, sleeve 54 is moved out of engagement with teeth 52 and into engagement with teeth 50. This locks together shafts 24 and 10 thereby establishing a direct drive connection between shafts 10 and 12.

Sleeve 54 is formed with a groove 70 for receiving the ends of the shifter fork 72. In a similar fashion, gear 44 is formed with an annular groove 74 that is adapted to receive the ends of a shifter fork 76.

Referring next to FIGURE 2, shifter fork 76 can be seen in more particular detail. Also, a reverse idler is shown in FIGURE 2 at 78. The cluster gear assembly previous described with reference to FIGURE 1 is shown in FIGURE 2 generally at 80.

The shifter fork 76 includes ends 82 and 84 received within the aforementioned groove 74. The shank 86 of the shifter fork 76 is received within a cam or arm 88 carried by a shaft 90, the latter in turn being journaled within a boss 92 on the housing 14. Shaft 90 can be grooved to receive a retainer pin 94 transversely disposed within the boss 92 thus retaining the shaft 90 in a fixed axial position.

A shift lever 96 is carried by the shaft and is secured at the end thereof by a key or splined connection. The end of the shift lever can be connected mechanically to a driver operated shift lever.

It will be apparent that when the lever 96 is rotated, fork 76 will be shifted in the direction of the axis of shaft 24 thus positioning adjustably the low and reverse gear 44.

Figure 4:
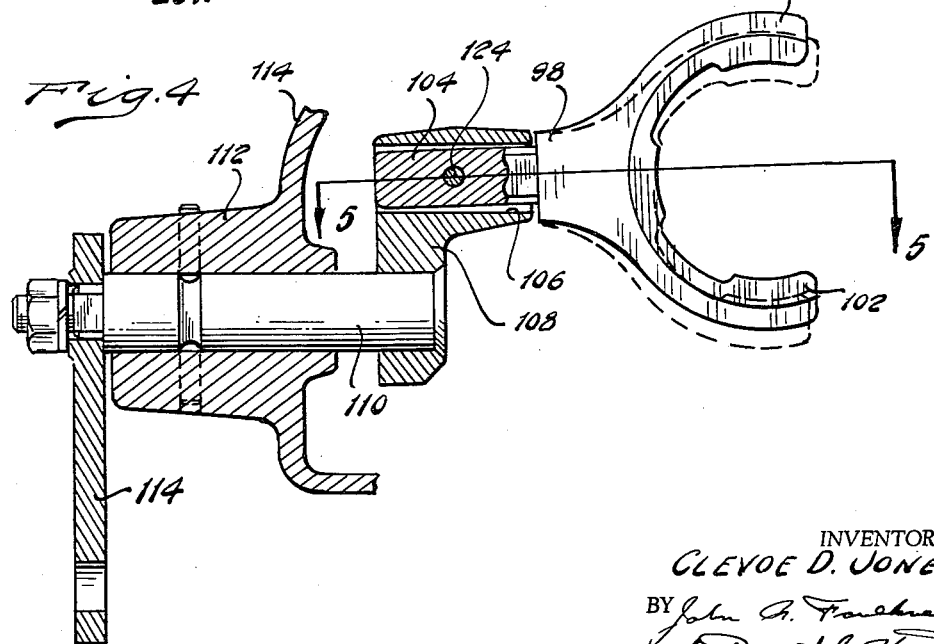
FIGURE 4 is a subassembly view showing a gear shifter fork for the low and intermediate gear.

In FIGURE 4 I have illustrated a shifter fork for the sleeve 54. It is similar in form to the shifter fork for the low and reverse gear. It is designated generally by reference character 98. The ends of the fork are shown at 100 and 102. These are received within the aforementioned groove 70. The shank of fork 98 is shown at 104 and is received within an opening 106 of a cam or arm 108 carried by shaft 110. A boss 112 is formed with an opening that receives shaft 10. A shift lever 114 is splined or otherwise positively secured to the end of shaft 110, and when it is rotated shaft 110 rotates about its axis. This in turn causes the shifter fork 98 to be shifted in one axial direction or the other depending upon the direction of motion of shift lever 114. As in the case of the shift lever 96, the shift lever 114 can be connected to the manually controlled gear shift lever.

Figure 3:
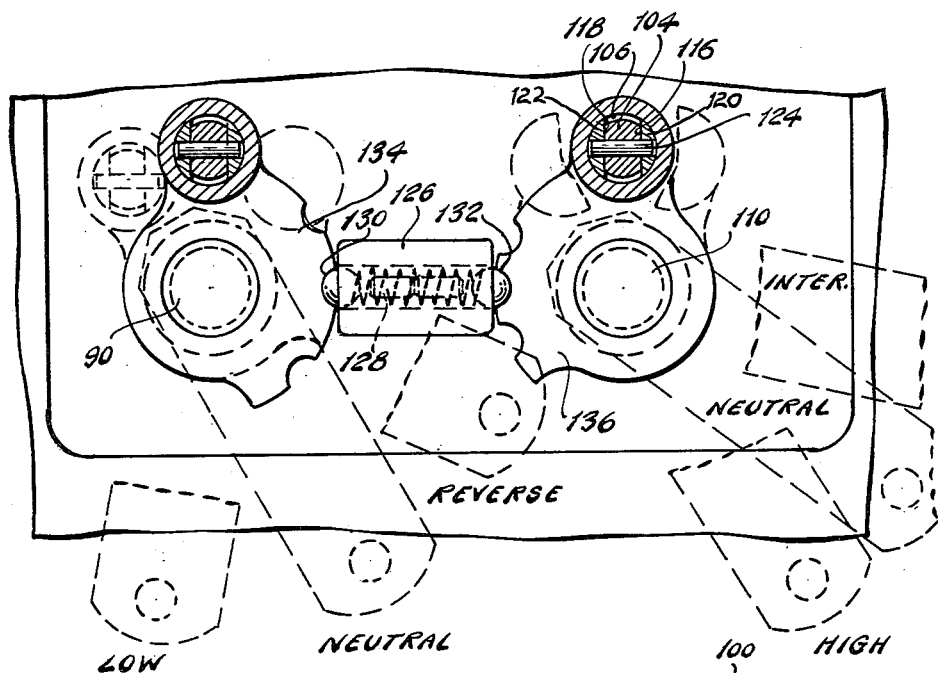
FIGURE 3 is a partial longitudinal cross-sectional view taken along section line 3—3 of FIGURE 2.

In order to illustrate the construction of the shifter fork of FIGURE 4, reference now will be made to FIGURES 3 and 5. The shank 104, as shown in FIGURE 5, is formed with a pair of flat surfaces 116 and 118. A pair of pilot bearing elements 120 and 122 is positioned against the flat surfaces 116 and 118, respectively. These elements are formed with arcuate outer surfaces having a curvature that is the same as the curvature of the opening 106 in the cam 108. As best seen in FIGURE 3, the center of curvature of the bearing surface for the bearing element 120 coincides with the center curvature for the bearing surface for bearing element 122. The centers of curvature coincide also with the axis of the opening 106.

A swivel pin 124 is received through the shank 104 and each of the bearing elements 120 and 122. Thus, when the shank 104 is rotated, sliding action takes place between the arcuate surfaces of the bearing elements 120 and 122 with respect to the inner surface of the opening 106. A clearance is provided, however, between the arcuate sides of the shank 104 and the curved surface of the opening 106. Thus, the shifter fork 98 can pivot about the axis of the swivel pin 104 and is free to oscillate also about the axis of the opening 106.

The shifter fork for the low and reverse gear 44 can be formed similar to the structure of FIGURES 4 and 5.

A detent interlock mechanism is shown in FIGURE 3. It comprises a boss 126 within which is received a pair of blocker elements 128. Detent balls 130 and 132 are carried within the boss 126 and are spring urged away from each other by a compression spring as indicated. Ball 130 engages cooperating recesses in detent plate 134 carried by shaft 90. In a similar fashion, shaft 110 carries a detent plate 136 having detent recesses that engage ball 132. The detents for each of the shifter forks establish the various operating positions for the shifter forks as well as an intermediate neutral position. The geometry of the detent, including the detent plates 134 and 136, can be chosen so that one gear shift lever cannot be actuated unless the other is in a neutral position.

During operation of the synchronizer clutch mechanism, the shifter fork 98 will be shifted in the fashion previously described. This results in axial movement of the sleeve 54 in one direction or the other. When the fork is in the neutral position, the ends 100 and 102 assume one position with respect to the axis of shaft 24. When the sleeve 54 is moved in a right-hand direction as viewed in FIGURE 1, the end 100 of the fork 98 will tend to move closer to the axis of shaft 24 and the end 102 will tend to move farther away. Similarly, the same displacement will tend to occur upon movement of the sleeve 54 from the neutral position to a direct drive position.

Compensation can be made, however, for the tendency of the ends of the shifter fork to rise and fall. This is done by the swivel or universal connection between the shank 104 and the cam 108. During shifting movement of the fork 98 the necessary relative rotation that must take place between the shank 104 and the cam 108 is accommodated by the bearing elements 120 and 122.

The compound motion thus imparted to the shifter fork 98 makes it possible to reduce the radial dimension of the groove 70. This in turn makes it possible to reduce the overall radial dimensions of the synchronizer clutch mechanism itself.

The function of the fork 76 is similar to that described with reference to FIGURES 4 and 5. The dimensional clearance problem associated with the intermediate and high synchronizer clutch mechanism, however, is not as critical in the case of the low and reverse gear 44. The swivel feature can be eliminated in the latter case if this is desired. In its place a conventional shifter fork construction can be employed. This would include a round shank rotatably received in a cooperating round opening in the associated cam that is connected to the shift lever.

Having thus described a preferred form of my invention, what I claim and desire to secure by United States Letters Patent is:

1. In a power transmission mechanism, a first torque delivery member, a second torque delivery member, a first clutch element connected to said first member, a second clutch element connected to said second member, a shifter fork having ends engageable with said second clutch element, an arm, pivotal means connecting said fork to said arm for a limited pivotal movement with respect thereto, means for rotatably mounting said arm for oscillation about an axis that is transverse to the axis of said driving and driven members whereby said second element can be moved into engagement with the first clutch element, said connecting means accommodating radial displacement of the ends of said fork relative to the axis of said arm when said second clutch element is positioned by said fork while preventing lateral displacement of the said ends relative to said connecting means.

2. In a power transmission mechanism having a first torque delivery member, a second torque delivery member, a first clutch element connected to said first member, a second clutch element connected to said second member, a shifter fork having ends engageable with said second clutch element, an arm, pivotal means connecting said shifter fork to said arm for a limited pivotal movement with respect thereto, means for rotatably mounting said arm for oscillation about an axis that is transverse to the axis of said driving and driven members, said arm having an opening, said fork having a shank received within said opening, and bearing means situated between said shank and the surrounding wall of said opening to accommodate rotation of said shank relative to said arm about the axis of said shank, said pivotal means accommodating oscillation of the shank of said fork about one axis transverse to the axis of oscillation of said arm while preventing oscillation of said shank about another axis transverse to the axis of oscillation of said arm.

3. In a power transmission mechanism, a first torque delivery member, a second torque delivery member, a first clutch element connected to said first member, a second clutch element connected to said second member, a shifter fork having ends engageable with said second element, an arm, means for rotatably mounting said arm for oscillation about an axis that is transverse to the axis of said driving and driven members, said arm having a circular bore, said fork having a shank received within said bore, opposed sides of said shank being flat, a separate bearing element having a crowned outer bearing surface secured to each flat surface of said shank, and a swivel pin extending through each bearing element and said shank to accommodate oscillation of said fork about an axis that is transverse to the axis of oscillation of said arm.

4. In a power transmission mechanism having a first torque delivery member, a second torque delivery member, a first clutch element connected to said first member, a second clutch element connected to said second member, a shifter fork having ends engageable with said second clutch element, an arm, said fork having a shank connected to said arm, means for rotatably mounting said arm for oscillation about an axis that is transverse to the axis of said driving and driven members, said arm having a circular bore, said shank being received within said bore, opposed sides of said shank being formed with flat surfaces, a separate bearing element situated adjacent each flat surface of said shank, each bearing element having a crowned bearing surface that is engageable with the inner surface of said bore, and a swivel pin extending through each bearing element and said shank to accommodate oscillation of said fork about an axis transverse to the axis of oscillation of said arm, said fork being rotatable relative to said arm about the axis of said shank.

5. In a power transmission mechanism, a power input shaft, a power output shaft, gear elements forming plural torque delivery paths between said driving and driven shafts, clutch means for connecting together selectively pairs of gear elements to condition said mechanism for torque delivery, said clutch means comprising a first clutch element connected to one gear element, an annular clutch element shiftable in the direction of the axis of said power input and power output shafts and engageable with said first clutch element, an annular groove formed in said clutch sleeve, a shifter fork having ends situated in said annular groove, said fork having a shank, an arm, means for oscillating said arm about an axis transverse to the axis of said driving and driven shafts, and a connection between said arm and said shank including bearing means having portions situated between said shank and said arm for accommodating oscillation of said fork about one axis transverse to the axis of oscillation of said arm while preventing oscillation of said shank about another axis transverse to the axis of oscillation of said arm and for accommodating relative rotation of said fork relative to said arm about the axis of said shank.

6. In a power transmission mechanism, a power input shaft, a power output shaft, gear elements forming plural torque delivery paths between said driving and driven shafts, clutch means for connecting together selectively pairs of gear elements to condition said mechanism for torque delivery, said clutch means comprising a first clutch element connected to one gear element, an annular clutch element shiftable in the direction of the axis of said power input and power output shafts engageable with said first clutch element, an annular groove formed in said clutch sleeve, a shifter fork having ends situated in said annular groove, said fork having a shank, an arm, means for oscillating said arm about an axis transverse to the axis of said driving and driven shafts, a bore in said arm, said shank being received within said bore, bearing means within said bore for accommodating oscillation of said fork about an axis transverse to the axis of oscillation of said arm and for accommodating relative rotation of said fork relative to said arm about the axis of said shank, said shank having opposed flat surfaces on either side thereof and said bearing means comprising a bearing element situated in engagement with each shank side, each bearing element having a crowned bearing surface engageable with the inner surface of said bore, and a swivel pin received through each bearing element and said shank to accommodate oscillation of said fork.

References Cited in the file of this patent
UNITED STATES PATENTS

| | | |
|---|---|---|
| 2,624,437 | Gardner | Jan. 6, 1953 |
| 2,862,398 | Zeidler et al. | Dec. 2, 1958 |